2 Sheets—Sheet 2.

W. H. FOYE.
Harvester.

No. 208,804.   Patented Oct. 8, 1878.

Witnesses
Geo. H. Strong.
Frank A. Burke

Inventor
Wm. H. Foye
by Dewey & Co.
Attys

UNITED STATES PATENT OFFICE.

WILLIAM H. FOYE, OF SAN FRANCISCO, CALIFORNIA.

IMPROVEMENT IN HARVESTERS.

Specification forming part of Letters Patent No. 208,804, dated October 8, 1878; application filed July 29, 1878.

*To all whom it may concern:*

Be it known that I, WILLIAM H. FOYE, of the city and county of San Francisco, and State of California, have invented a Combined Header and Reaper; and I do hereby declare the following to be a full, clear, and exact description thereof, reference being had to the accompanying drawings.

My invention relates to a combined harvester and reaper of novel construction; and the object of the invention is to provide a light, strong, and durable machine, which will combine the peculiar separate advantages of a reaper and a header without the disadvantage of the side draft of the reaper—a loss of motion on the sickle while turning a corner—the machine being so constructed as to be run by either horse or steam power with trifling changes, while the whole is simple in construction and easily understood and operated.

This machine is especially designed for use in California, where the land is usually in immense tracts, nearly level, and without obstructions, and where the quality of the grain depends upon the rapidity with which it can be cut after it is ripe. The quantity will also be seriously diminished by the dry hot winds of the rainless summer, and a machine which, like this, will cut upward of seventy-five acres per day is a great desideratum.

My invention consists in the several combinations of devices hereinafter explained and claimed.

At the outer end or termination of the "draper" or carrying-belt I have formed a device for bundling or forming the grain into sheaves as it is received from the carrying-belt, and there are various details of construction, which will be more fully described by referring to the accompanying drawings, in which—

Figure 1:
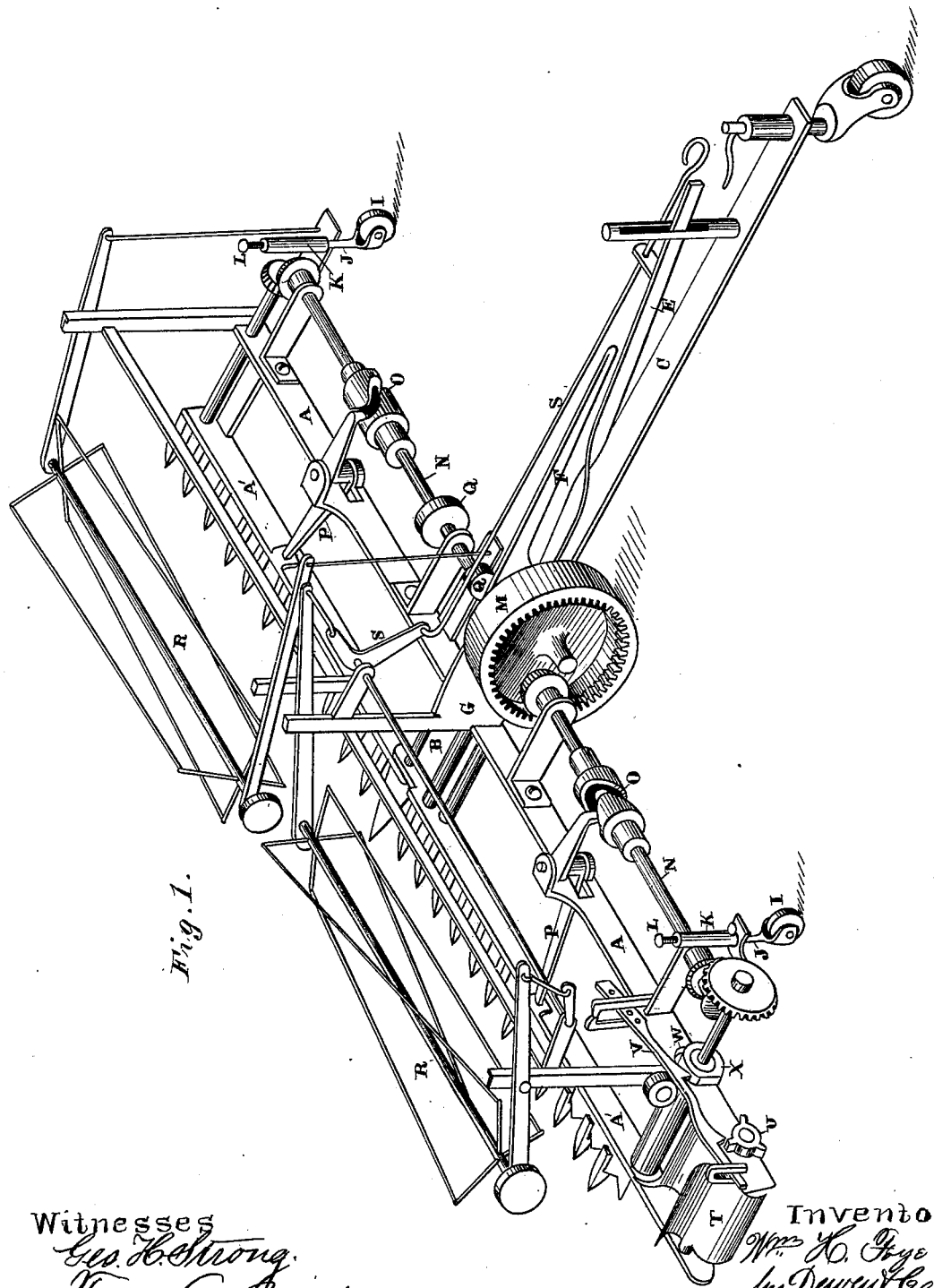
Figure 2:
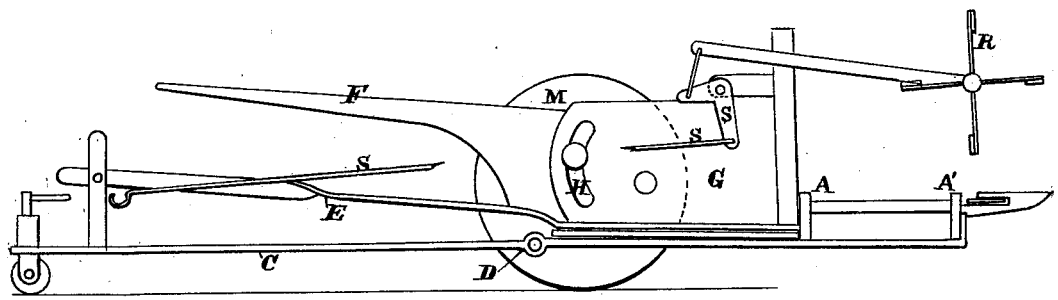
Figure 3:
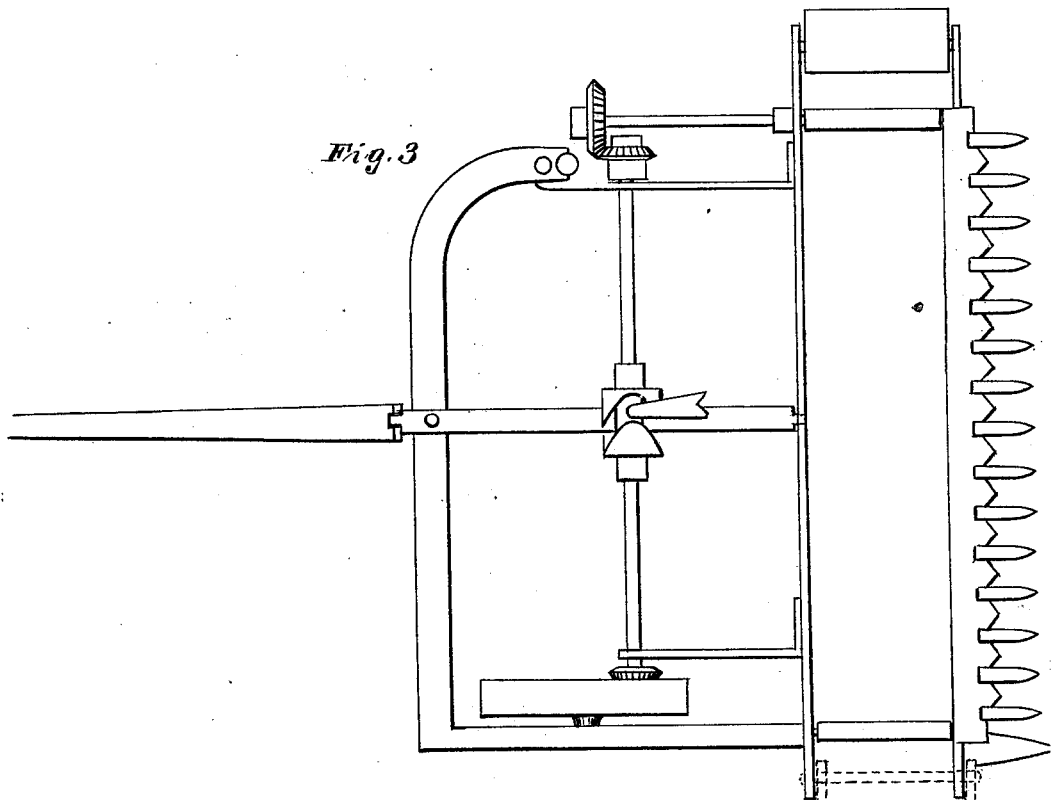

Figure 1 is a view of my machine. Fig. 2 is a sectional view. Fig. 3 is a plan view of one section.

In the construction of my machine I employ angle-iron to form the frame A A', and this frame serves to support the mechanism. By forming the frame of angle-iron I am enabled to lighten it in construction and appearance, to overcome the warping, shrinking, and deterioration which exposure to the weather produces in all cases where wooden frames are used, and I produce a frame of superior stiffness. This frame is constructed in two independent and complete sections, which are hinged or pivoted together at the center by a bolt, B, so that they can easily be separated when desired. The pole C, to which the team is attached, or by which the machine is connected with the traction-engine, when one is used to propel it, projects backward from the frame, and is connected with one of the halves, A, by a joint, D, so that the frame may be raised or lowered by the usual lever E, to accommodate it to the minor changes which will occur in the height of the grain. Any considerable permanent change in the level of the cut which is to be made will be accomplished by means of a lever, F, which has its inner end pivoted to the vertical plate G, which is secured to the frame A, while the driving-wheel is mounted upon this lever F.

A slot, H, through this vertical plate is provided with notches, into which a catch or bolt is made to fall, which is controlled by a spring-handle on the lever F, thus holding the frame A at the desired position relative to the pole, while the minor adjustments are made, as before described, by the usual lever E.

The frame A A' is made very long, and may be about double the length of ordinary machines, on account of the peculiarity of its construction, which enables it to accommodate itself to the elevations and depressions in the surface of the ground by means of the central joint before described.

The ends and also the center of the machine are supported upon caster-wheels I, when the machine is to be driven by a traction-engine, so that when it becomes necessary to turn the engine the machine will easily move around the same center upon which the engine turns, which is not that upon which the machine would turn by itself. In other words, the machine must move around in a circle sidewise when it turns, and consequently these caster-wheels play a very important part in the movements of the machine. These wheels are mounted, by means of stems or standards J, which enter sockets K, upon the frame. By means of screws L, or equivalent devices, the standards are moved up and down in their sockets, and the ends of the machine are thus adjusted to correspond with the elevation and depression of the center, as before described.

The stems may be slotted along one side, and a set-screw passing through one side of the socket may enter this slot, and thus prevent the wheel from turning, while at the same time it is allowed to move up and down in the socket.

When the machine is to be driven by horse-power, it will only be necessary to substitute driving-wheels M for the central caster-wheel, and these wheels have gears to mesh with the pinions of the sickle-driving shafts N. These shafts carry the double or slotted cams O, by which the sickle-operating levers P are caused to oscillate. In transposing the machine from a horse-power to a steam-power machine, it will only be necessary to remove the wheels M, and by means of the belt-pulleys Q the sickle may be driven directly from the engine, and at any speed, independent of the movements of the machine over the ground, as shown in right-hand section.

The reels R are raised and depressed by means of a bell-crank lever and an operating-handle, S, as shown.

The draper or carrying-belt is not different is construction from those ordinarily used; but I have a novel method of receiving and bundling the straw as it leaves the belt, so as to form sheaves. This device consists of a series of curved receivers, T, which are mounted upon a shaft rotating transversely to the end of the draper and just beyond it, so that the straw from the draper is deposited in these receivers until they are full.

In order to rotate the shaft and empty each receiver while another is brought to its place, a disk or wheel, U, is secured to the end of the shaft, and projections upon it are caught and held by a catch upon a spring-lever, V. This catch is disengaged by a projection, W, upon the pulley X at the end of the shaft of the draper pulley or roller, so that when full, or at each revolution or partial revolution of the pulley X, the receivers will be discharged, and sufficient straw to form a sheaf will be deposited upon the ground at each partial revolution of the device.

If preferred, the automatic discharging apparatus may be dispensed with, and the pawl or catch may be operated by a lever or cord within reach of the driver or operator.

If desired, the usual inclined elevator may be used to convey the straw to a "header-wagon," when one is used.

When it is desired to employ only one half of the machine, the other half may be detached by simply withdrawing the bolt B, and there will be no side draft. When but one half of the machine is to be used, the lever by which it is adjusted, and the pole, will be moved to the center of this half, where it will be supported as shown in Fig. 3.

The machine is extremely manageable, notwithstanding its great size, on account of being made in two independently-working halves, mounted upon the exterior caster-wheels. With it I am enabled to run into corners and do clean work in turning, as the cutters do not stop while the machine is turning.

When the right-hand section is removed the supplemental frame is fitted upon the main frame by bolts, and the pole is then hinged to its center, thus preparing the machine for its reduced work with but little trouble. A spreader is secured to the front and center of the machine, to separate the grain and guide it to the cutters of the two halves.

Having thus described my invention, what I claim as new, and desire to secure by Letters Patent, is—

1. The combination, in a harvesting-machine, of two independent reaping mechanisms, detachably hinged together, one of said mechanisms being provided with a pole capable of attachment at two or more points along its width, for the purpose of enabling said reaping mechanisms to be used either conjointly or one alone, substantially as described.

2. The frame A A', with its pole C, jointed or hinged to the frame at D, to allow the height of the cutters to be regulated, in combination with the lever F, to which the driving-wheel is attached, said lever being pivoted to the main frame and held at any point by a suitable catch for permanent adjustment, substantially as herein described.

3. The caster-wheels I, having their stems or standards J fitted to move vertically in the hollow sockets K of the frame A, a vertical adjustment being made by means of the screws L, or equivalent device, substantially as herein described.

4. The receivers T, mounted so as to receive the cut straw from the carrying-belt, as shown, and having the shaft provided with the disk U, with its projections or stops, in combination with the spring-lever catch V, projection W, and cam X, constructed and arranged substantially as herein described and shown.

WILLIAM H. FOYE.

Witnesses:
M. A. NEAL,
FRANK A. BROOKS.